(12) United States Patent
Crutcher

(10) Patent No.: US 6,658,123 B1
(45) Date of Patent: Dec. 2, 2003

(54) SONIC RELAY FOR THE HIGH FREQUENCY HEARING IMPAIRED

(76) Inventor: William C. Crutcher, Munson Rd., Middlebury, CT (US) 06762

( * ) Notice: Subject to any disclaimer, the term of this patent is extended or adjusted under 35 U.S.C. 154(b) by 384 days.

(21) Appl. No.: 09/620,427

(22) Filed: Jul. 20, 2000

Related U.S. Application Data

(63) Continuation-in-part of application No. 08/969,582, filed on Nov. 13, 1997.
(60) Provisional application No. 60/030,829, filed on Nov. 15, 1996.

(51) Int. Cl.[7] ............................................... H04R 25/00
(52) U.S. Cl. ........................ 381/315; 381/312; 381/56
(58) Field of Search ...................... 381/56, 57, 312, 381/315, 316, 98; 340/902, 458, 438, 942, 944

(56) References Cited

U.S. PATENT DOCUMENTS

| | | | | |
|---|---|---|---|---|
| 4,237,449 A | * | 12/1980 | Zibell | 340/384.7 |
| 5,278,553 A | * | 1/1994 | Cornett et al. | 340/902 |
| 5,651,070 A | * | 7/1997 | Blunt | 381/56 |
| 5,790,050 A | * | 8/1998 | Parker | 340/902 |

* cited by examiner

*Primary Examiner*—Curtis Kuntz
*Assistant Examiner*—Brian Ensey

(57) ABSTRACT

A portable battery-powered sonic relay amplifies periodic beeping sounds from an alarm clock, smoke alarm, electronic watch or the like and analyzes the sound pulses in a logic circuit. If the sounds are periodically repeated high frequency sounds, a sound producer emits loud, low frequency sounds from a buzzer or the like, which may be heard more easily by a person with high frequency impaired hearing.

7 Claims, 2 Drawing Sheets

SONIC RELAY FOR THE HIGH FREQUENCY HEARING IMPAIRED

CROSS REFERENCE TO RELATED APPLICATIONS

Figure 1:
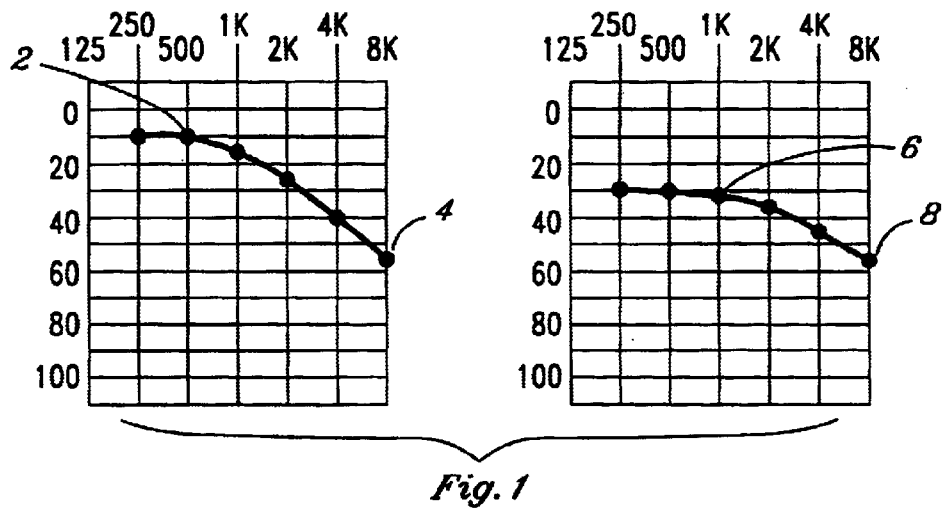

This application is a continuation-in-part of prior application Ser. No. 08/969,582 filed Nov. 13, 1997, which prior application claims the benefit of provisional application Ser. No. 60/030829 filed Nov. 15, 1996.

FIELD OF THE INVENTION

This invention relates generally to sonic alarm devices and more particularly to a sonic alarm device adapted for a person with high frequency hearing impairment.

DESCRIPTION OF THE PRIOR ART

A large percentage of the population, especially older people, suffer impaired hearing of sounds in the high frequency part of the normal frequency range of audible hearing. A great many electronic alarm devices and warning devices emit periodic high frequency pulses. Usually these beeping sounds are generated by piezoelectric crystals. Unfortunately, these high frequency periodic beeps cannot be heard by people with high frequency hearing loss. Examples of such devices are smoke alarms, electric alarm clocks, alarm wristwatches, and some types of telephone annunciators.

Hearing devices have been disclosed in the prior art which separate the received sounds into frequency ranges and then treat the frequency bands separately. Hearing devices have primarily concentrated upon restoring a full range of frequencies, using well-known electronic techniques such as filters, compression, AGC etc. in an effort to provide normal hearing perception to the hearing impaired. An excellent catalog of this prior art is provided in U.S. Pat. No. 5,500,902, issued Mar. 19, 1996 to Stockham et al. These devices are very expensive and while they duplicate normal hearing while being worn, they are normally not worn during sleeping. Failure to hear an electronic alarm clock or a smoke alarm could be inconvenient or perhaps fatal.

U.S. Pat. No. 5,666,331 issued Sep. 9, 1997 to Kollin discloses an alarm clock for a hearing impaired person, in which a remote device responsive to audible alarm sounds generates carrier signals over the electrical power lines supplying power to an alarm clock, which cause a vibrator, lamp or sound device to pulse in synchronization with the power line frequency. This device is dependent upon the electric power lines to power the devices and to transmit the signals between devices.

U.S. Pat. No. 5,495,242 issued Feb. 27, 1996 to Kick et al. discloses a warning system for a hearing impaired automobile driver to detect a siren emitting sounds from a previously known category of siren sounds, and employing autocorrelation of digital signals to determine a repetitive pattern. However, an expensive digital signal processor is required for the autocorrelation and the device is not intended to detect high frequency beeps.

It would be desirable to have a portable, battery powered device which is responsive to certain types of audible alarm sounds and which will translate the alarm sounds into a form which may be heard by a person with high frequency hearing impairment.

SUMMARY OF THE INVENTION

Briefly stated, the invention comprises a battery-powered sonic relay, which is responsive to repetitive high frequency sonic pulses including at least the upper frequency range of human hearing, having logic means for determining that the repetitive pulses are occurring at a constant pulse repetition rate, and a sound producer responsive to the logic means adapted to produce sound predominately at low frequencies below those of the upper frequency range.

One version of the sonic relay employs pulse logic means adapted to provide a first logic signal when the sonic pulses occur at a constant repetition rate, and frequency filter means to provide a second logic signal when the sound frequencies are within the upper frequency range, the logic circuit being responsive to the first and second logic signals and providing an output signal to the sound producer.

Another embodiment of the invention uses a high pass filter with a signal detector to generate a digital signal in response to a sonic pulse within the upper frequency range, and a logic circuit comprising a microcontroller programmed to determine the start and end of such a sonic pulse and the interval until the start of the next such sonic pulse, and then provide an output to the sound producer if the pulses are occurring at a constant repetition rate.

DRAWINGS

Figure 2:
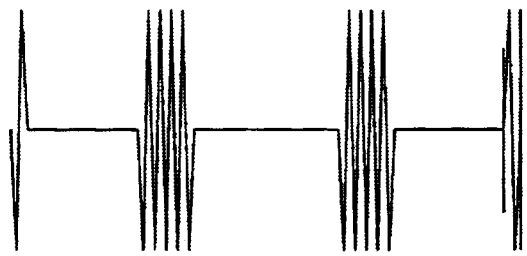
Figure 3:
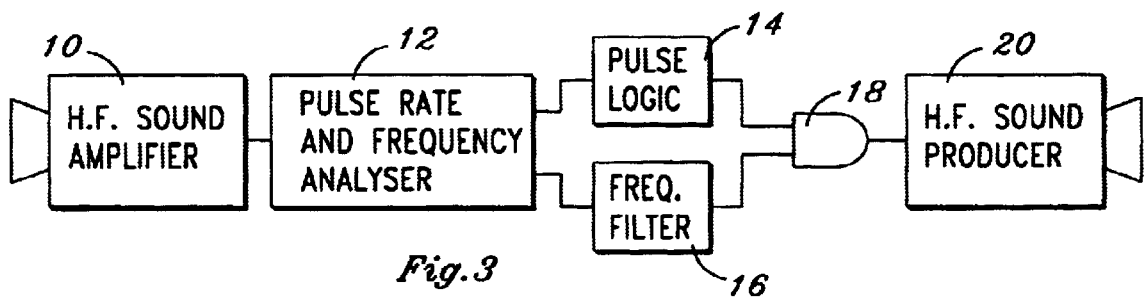
Figure 4:
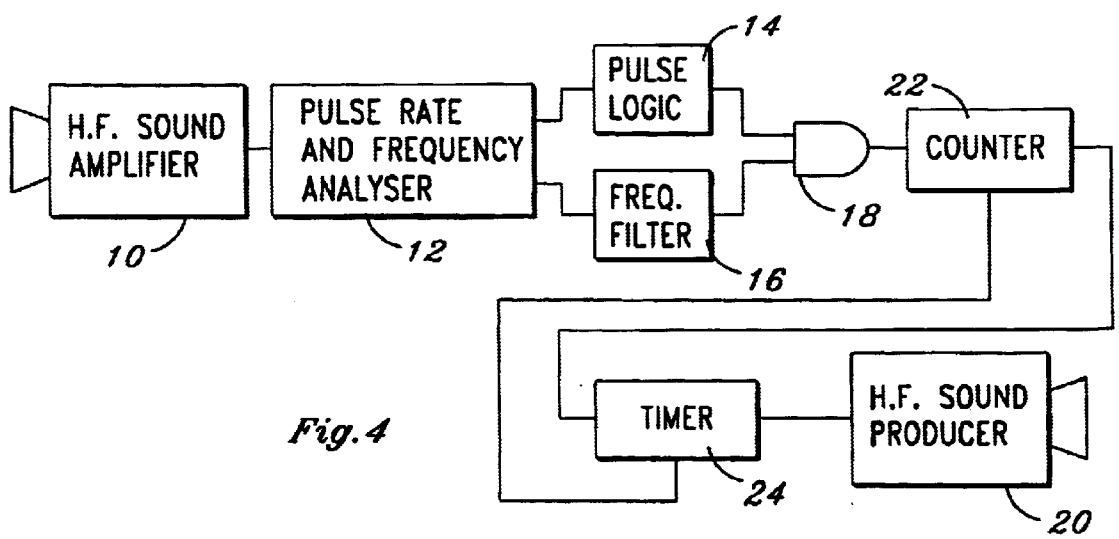
Figure 5:
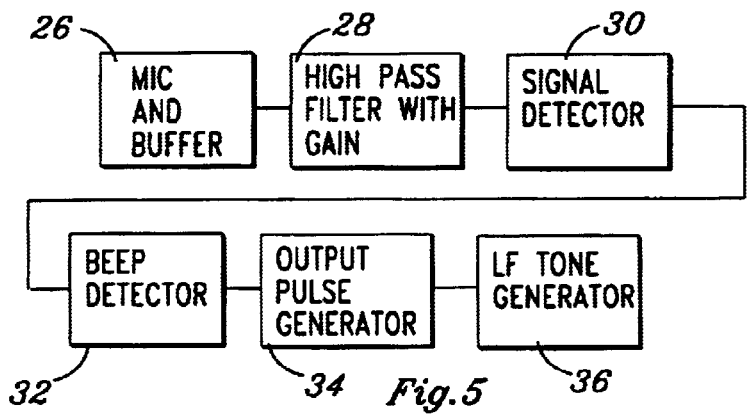
Figure 6:
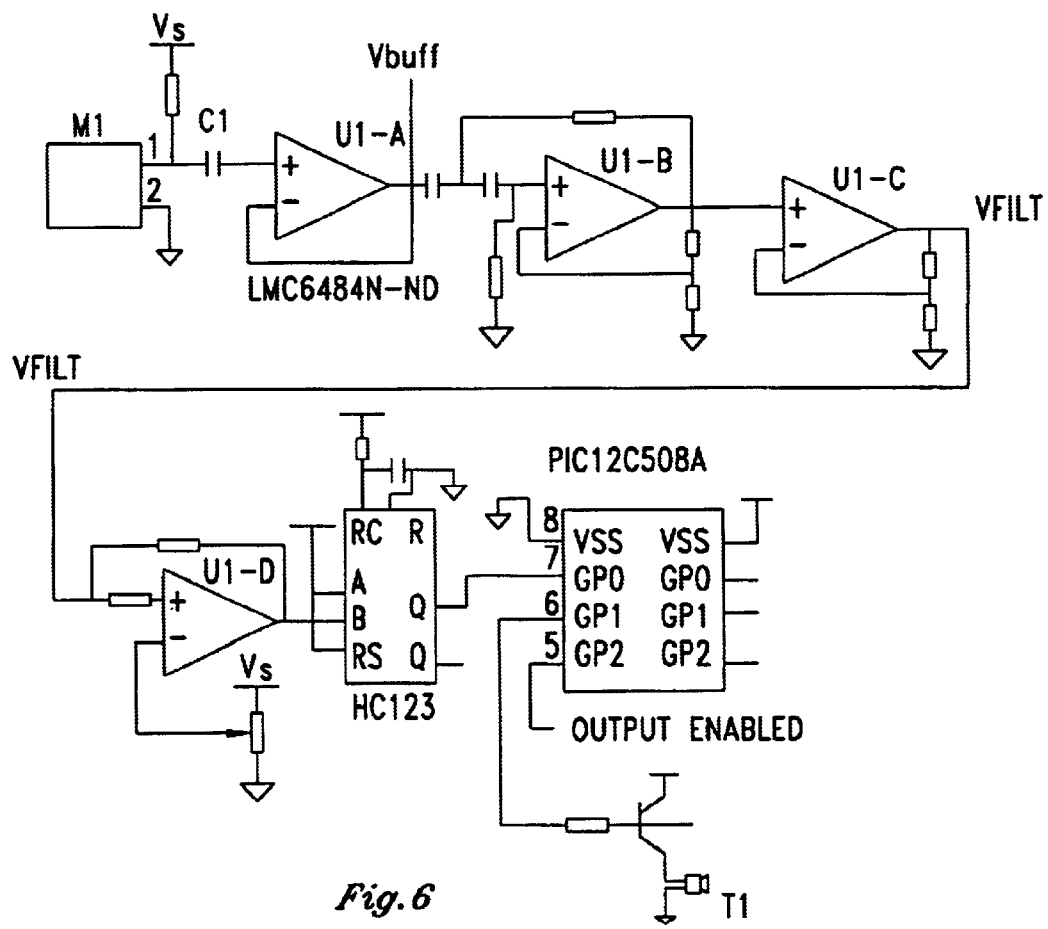
Figure 7:

These and many other advantages will be apparent by reference to the following description, taken in connection with the accompanying drawings in which:

FIG. 1 is an audiogram of left and right ears of a high frequency impaired person, FIG. 2 is a simplified wave diagram of high frequency sonic pulses from an alarm sound generator, FIG. 3 is a simplified block diagram of a sonic relay according to a first embodiment of the present invention, FIG. 4 is a block diagram of a modified form of the first embodiment of the invention, FIG. 5 is a block diagram of a second embodiment of the invention, FIG. 6 is a schematic circuit diagram of the second embodiment of the invention, and FIG. 7 is a pulse train diagram of periodic pulses having a constant pulse repetition rate.

DESCRIPTION OF THE INVENTION

FIG. 1 represents a typical audiogram of a high frequency impaired person. One diagram for each ear is shown, with the ordinate representing hearing threshold level in dB and the abscissa representing frequency in Hz. In the ear of the left diagram, acuity begins to drop off from a level of 10 dB at a frequency of 500 Hz, shown at reference number 2, gradually diminishing to a 55 dB loss at 8000 H, shown at reference number 4. In the ear of the right diagram there is a more abrupt decline from a hearing threshold level of 30 dB at 1000 Hz, shown at reference number 6, to a level of 55 dB at 8000 Hz, shown at reference number 8.

FIG. 2 represents a sound wave generated by a typical piezoelectric crystal in an electronic device, using a pulse generator, which produces sonic bursts of high frequency oscillations of the piezoelectric crystal. The sound wave is characterized by sonic pulses having a fixed or constant pulse repetition rate or periodicity of the beeping noises, and by the frequency of the oscillations making up the sonic pulses. For example, a beeping noise may have 0.5 seconds between beeps, and a frequency of 3500 Hz. This may be inaudible to a person of impaired high frequency hearing.

First Embodiment

In accordance with a first embodiment of the present invention, FIG. 3 shows a simplified block diagram of a sonic relay which is adapted to receive a high frequency sound comprising sonic pulses or beeps of the type described in FIG. 2. All of the separate components pictured in the blocks are conventional and within the design knowledge of one skilled in the art. The sound signals are amplified in high frequency (H.F.) sound amplifier 10, which supplies an amplified electrical signal to pulse rate and frequency analyzer 12. There, the pulse envelope and high frequency parts are separated by filtering techniques well known to those skilled in the art and described and referenced in the aforementioned Stockham patent 5,500,902, which is incorporated herein by reference. The pulse envelope is converted to a square wave signal and fed to pulse logic block 14. Logic block 14 is designed to test the pulse repetition rate or duty cycle of the square wave and to provide output logic level signals only if the pulses are periodic in nature and occur at a fixed repetition rate. For example, the rise time intervals of a selected number of pulses may be timed to determine that pulses are arriving at a constant rate. If the pulses occur at a fixed repetition rate, a first logic level signal is output for a time interval corresponding to the duration of the pulse.

The high frequency signals are supplied to a high pass filter in frequency filter 16. The high pass filter is designed to pass only the high frequency range above 1000 Hz, and to provide a second logic level signal if the frequency is above a selected frequency, for example 1000 Hz.

The first and second logic level signals are connected as inputs to an AND circuit 18. The output of AND 18 is connected to a low frequency (L.F.) sound producer 20. L.F. sound producer 20 may be a conventional buzzer or noisemaker with substantial volume so as to be heard. The L.F. sound producer may also be a piezoelectric crystal designed to operate at a lower frequency. The coincidence of a pulse from a constant pulse repetition rate source, and a logic signal indicating that the frequency of the source sonic pulse exceeds a pre-selected frequency will produce a corresponding pulse of low frequency sound from sound producer 20. FIG. 3 is designed to produce a one-for-one L.F. sound burst for every H.F. sound burst received. The high pass filter prevents feedback through the system of the output low frequency sound from sound producer 20.

FIG. 4 shows a modified form of the first embodiment of the invention. FIG. 4 uses the same components 10 through 20 as the FIG. 3 design, but interposes a counter 22 and a timer 24 between AND circuit 18 and low frequency sound producer 20. After the initial determination that the received sounds are H.F. periodic signals, logic pulses are output from AND 18, as before. The pulses are supplied to counter 22 where a pre-selected number of pulses are counted, after which the counter is arranged to provide an output to timer 24. This initiates a pre-selected time period and also initiates an output signal to L.F. sound producer 20. Sound producer 20 emits a loud low frequency sound until the timer 24 times out and resets counter 22. It is important that the sound emitted from sound producer 20 is not the same type of sound as that to which the pulse rate and frequency analyzer 12 responds. If feedback is evident the counter output can be arranged to also disable the amplifier 10, and the timer reset line can be connected to re-enable the amplifier 10. The design of FIG. 4 will produce an intermittent low frequency sound interrupting the high frequency beeps.

Second Embodiment

FIG. 5 is a system block diagram for a second embodiment of the invention. Rather than combining first and second logic signals in an AND circuit, the signals are processed in series to first determine if the audio input signals are high frequency sonic pulses, and then to analyse in a logic circuit whether they are beeps occuring at a constant repetition rate having the requisite periodicity. FIG. 5 shows the signal flow from audio input to audio output of the sonic relay. Audio signals are received at a microphone and buffer 26. The signals include periodically occurring sonic beeps at a frequency which is within the upper range of human hearing, but inaudible to a person with frequency impaired hearing. The buffer isolates the microphone from the circuit and adds appropriate gain. A high pass filter 28 removes low frequency components from the signals. A band pass filter may be used in lieu of high pass filter 28 to also remove extraneous very high frequency noises, such as clicks, not associated with the desired signal to be processed. The filtered analog signal is then fed into an H.F. signal detector 30, which in turn, outputs a digital signal to indicate that a high frequency signal is present. The digital signal is then processed and analyzed by a logic circuit 32 to see if the signal has a periodicity, i.e. is composed of a repetitive series of high frequency sonic pulses or beeps having the same characteristics and occurring at a constant repetition rate. If these logic condition are met, the logic circuit 32 generates a logic output signal. The logic output signal actuates an output pulse generator 34 that remains active for a pre-selected period of time and then inactive for a pre-selected period of time. At the end of its inactive period, the pulse generator 34 may again be activated by the logic circuit 32. The output pulse generator 34 controls a L.F. tone generator 36, which produces an output sound at a low frequency lower than the upper range which was inaudible and selected to be audible to a high frequency impaired person.

FIG. 6 shows the detailed circuit for the block diagram of FIG. 5. An omnidirectional electret condenser microphone is used. These are low-cost rugged devices that are used widely in telephones, tape recorders and toys. The input is buffered with an op-amp in a voltage follower configuration. The output signal Vbuf is identical to the input signal, but the relatively high output impedance of the microphone is isolated from the circuit for maximum signal transfer.

A high pass filter is used to filter out low frequency signals. This filter is done with an op-amp in a modified sallen-key configuration with gain added. The corner frequency separating the upper and lower frequency ranges is set at 1000 Hz. The output of this section is Vfilt.

The signal detector is an op-amp comparator with an adjustable threshold followed by a one-shot setup as a peak stretcher. The input is the analog signal Vfilt and the output is a digital signal called SIGNAL_PRESENT. If the Vfilt exceeds a threshold, the peak stretcher will hold the output SIGNAL_PRESENT active for approximately one microsecond. If the frequency of the input signal is greater than 1000 Hz, which is selected in the present example as the frequency at the lower end of the upper range of sounds inaudible to a person of frequency impaired hearing, it will have re-triggered the peak stretcher resulting in SIGNAL_PRESENT remaining active as long as Vfilt is present. Refer UI-D and U2 in the schematic drawing of FIG. 6. The threshold is set with potentiometer RS to be 50 mV greater than the idle voltage. This needs to be done at the time of manufacture.

The input to the logic circuit 32 (beep detector) is a digital signal that is high when there is a high frequency audio signal present at the microphone and low when there is not (SIGNAL_PRESENT). The logic circuit 32 (beep detector) must decide when this is a beep and whether the beeps have periodicity and force the output (BEEP_DETECTED) high the logic conditions are met. A beep is defined as a signal that is present for a time TI and absent for a time T2 and then present again. FIG. 7 illustrates a pulse train which is then analyzed by the logic circuit software program to determine periodicity.

The beep detector will be active when the following beep condition is met: T1min<T1<T1max and T2min<T2<T2max.

The logic circuit 32 must determine if the beeps have periodicity. Any number of logic conditions known to those skilled in the art may be implemented in the PIC software program to determine if the sonic pulses have the same characteristics and are arriving at a constant repetition rate, which indicates that they are generated by an intelligent source and not random noises.

For example, the pulse lengths and intervals between pulses may be measured and if they are the same and follow the same pattern after counting a few pulses, then the periodicity condition is met. In the case where the beeps occur in a more complicated pattern, but are indicative of generation by an intelligent source, eg. repetitive pattern of beeps from an alarm watch, a suitable software program may be devised by those skilled in the art.

The logic circuit 32 or beep detector is implemented in software in a PIC 508A microcontroller shown as U3 in the schematic of FIG. 6. When the periodic beeps are detected it passes control in software to the output pulse generator 34 and the L.F. tone generator 36.

The output pulse generator 34 and the L.F. tone generator 36 shown as separate blocks in FIG. 5 are actually implemented by software within the PIC. It generates a tone that will be active for a pulse as depicted graphically with the signal OUTPUT_ENABLE. The tone from speaker T1 is audible when OUTPUT_ENABLE is high.

The output tone generator will be a square wave at approximately 600 Hz, which below the upper range of the processed H.F. sonic pulses and is low enough in frequency for the frequency impaired person to hear effectively. This frequency will be adjustable in software for easy modification.

The sonic relay is preferably portable and battery powered so that it can be placed at a bedside. In this way it will function to assure hearing an alarm clock or watch, and more importantly a possible beeping sound of a distant smoke alarm. At the same time it will not be triggered by random noises or low frequency sounds which are within the hearing range of people who are only high frequency impaired.

While there have been disclosed herein two embodiments of the invention, it is desired to cover in the appended claims all such modifications as fall within the true spirit and scope of the invention.

What is claimed is:

1. A sonic relay responsive to a source of high frequency sonic pulses composed of sound at high frequencies including at least the upper frequency range of human hearing and occurring at a constant repetition rate, said sonic relay being arranged to provide low frequency sound audible to the high frequency hearing impaired and comprising:

an amplifier responsive to repetitive sonic pulses composed of sound at high frequencies including at least said upper frequency range, said upper frequency range commencing at a threshold frequency above which sound is inaudible to a high frequency hearing impaired person, and arranged to provide amplified electrical signals, frequency filter means responsive to said amplified electrical signals for removing signals outside said upper frequency range and adapted to provide an output signal, logic circuit means responsive to said output signal comprising a microcontroller programmed to provide a logic output signal when the sonic pulses have the same pulse length and the pulses occur at said constant repetition rate, and a sound producer responsive to said logic output signal and adapted to provide sound predominantly at low frequencies within a frequency range of human hearing below that of said threshold frequency.

2. Sonic relay according to claim 1, wherein the frequency filter means comprises a high pass filter and the threshold frequency is on the order of 1000 Hz.

3. Sonic relay according to claim 1, wherein the sound producer is a battery operated buzzer.

4. Sonic relay according to claim 1, wherein the sound producer is a piezoelectric crystal designed to vibrate at a lower frequency than the frequency of the oscillations of said sonic pulses.

5. Sonic relay according to claim 1, and further including a counter connected to count a pre-selected number of logic output signals from the logic circuit means and to provide a second output signal when a pre-selected count is reached, and a timer responsive to the second output signal and arranged to actuate the sound producer for a pre-selected time.

6. A sonic relay responsive to a source of high frequency sonic pulses composed of sound at high frequencies including at least the upper frequency range of human hearing and occurring at a constant repetition rate, said sonic relay being arranged to provide sound audible to the high frequency hearing impaired and comprising:

an amplifier responsive to repetitive sonic pulses composed of sound at high frequencies including at least said upper frequency range commencing at a threshold frequency above which sound is inaudible to a high frequency hearing impaired person, and arranged to provide amplified electrical signals, frequency filter means responsive to said amplified electrical signals for removing signals outside said upper frequency range and adapted to provide an output signal, logic circuit means responsive to said output signal and adapted to provide a logic output signal when the sonic pulses have the same pulse length and the pulses occur at said constant repetition rate, and a sound producer responsive to said logic output signal and adapted to provide sound predominantly at low frequencies within a frequency range of human hearing below those of said upper frequency range, wherein the logic circuit means is arranged to output the logic output signal for a time interval corresponding to the duration of said sonic pulse, whereby the low frequency sounds are of the same duration as the high frequency sonic pulses.

7. A sonic relay responsive to a source of high frequency sonic pulses composed of sound at high frequencies including at least the upper frequency range of human hearing ad occurring at a constant repetition rate, said sonic relay being arranged to provide sound audible to the high frequency hearing impaired and comprising:

an amplifier responsive to repetitive sonic pulses composed of sound at high frequencies including at least said upper frequency range commencing at a threshold frequency above which sound is inaudible to a high frequency hearing impaired person, and arranged to provide amplified electrical signals, frequency filter means responsive to said amplified electrical signals for removing signals outside said upper frequency range and adapted to provide an output signal, logic circuit means responsive to said output signal and adapted to provide a logic output signal when the sonic pulses have the same pulse length and the pulses occur at said constant repetition rate, wherein the logic circuit means comprises a microcontroller programmed to determine the start and end of a sonic pulse and to determine periodicity by measuring pulse lengths and intervals between pulses, and a sound producer responsive to said logic output signal and adapted to provide sound predominantly at low frequencies within a frequency range of human hearing below those of said upper frequency range.

* * * * *